Oct. 12, 1965
C. E. MUNTZ
3,210,865
LEARNING AID DEVICE
Filed Jan. 24, 1963
2 Sheets-Sheet 1
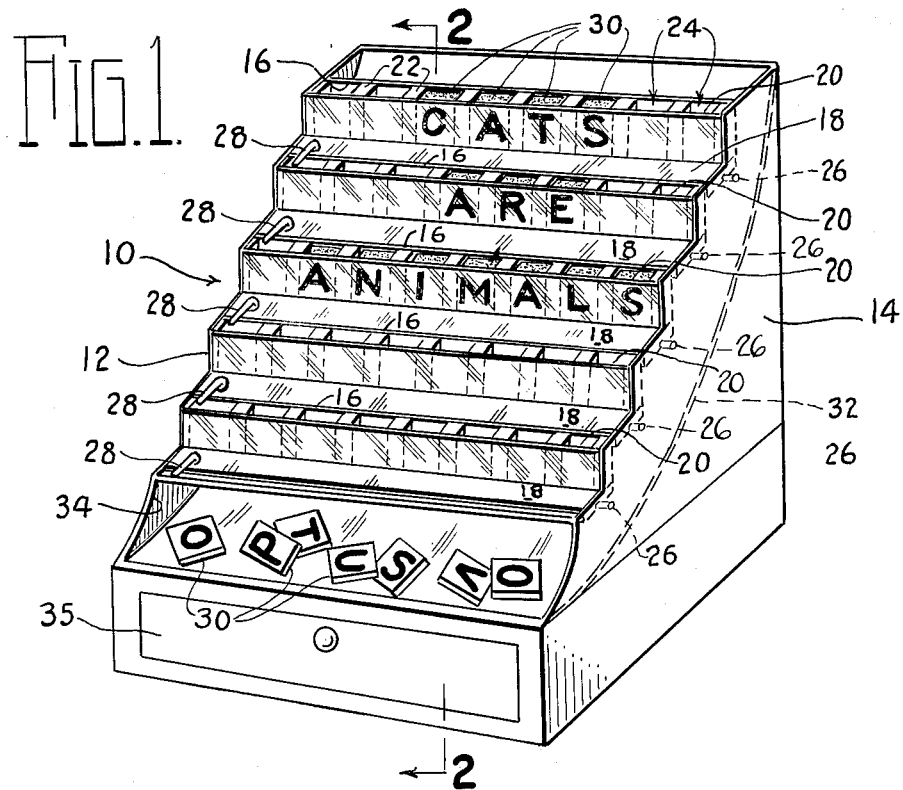
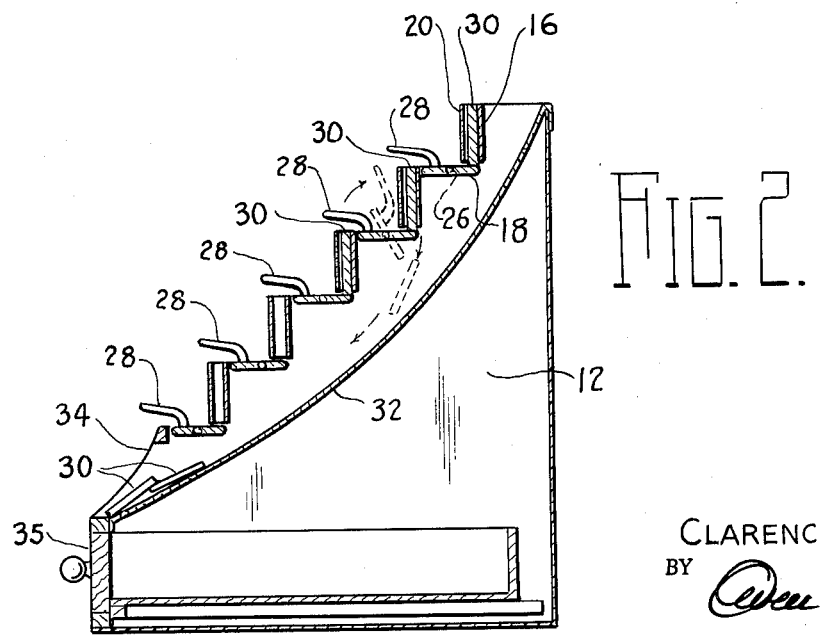
INVENTOR.
CLARENCE E. MUNTZ
BY
ATTORNEYS Oct. 12, 1965 C. E. MUNTZ 3,210,865
LEARNING AID DEVICE
Filed Jan. 24, 1963 2 Sheets-Sheet 2
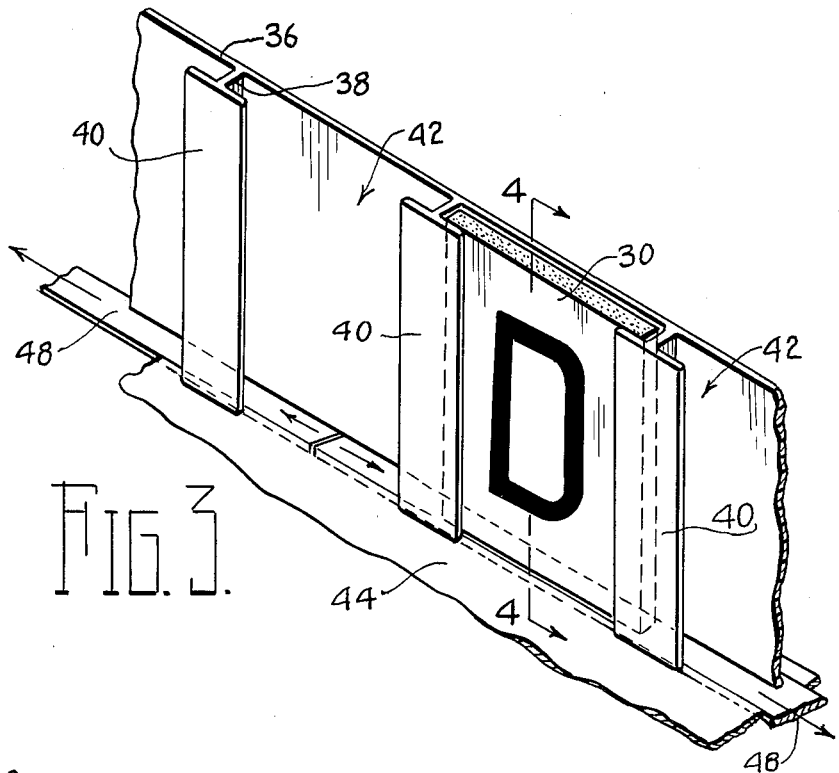
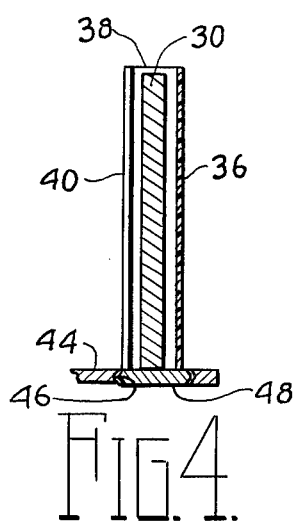
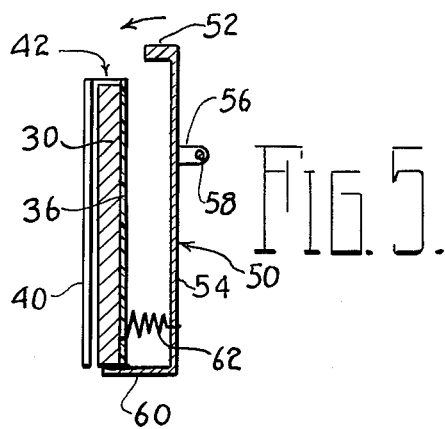
INVENTOR.
CLARENCE E. MUNTZ
BY
ATTORNEYS United States Patent Office 3,210,865
Patented Oct. 12, 1965

3,210,865
LEARNING AID DEVICE
Clarence E. Muntz, 1130 Mason St., Toledo, Ohio
Filed Jan. 24, 1963, Ser. No. 253,540
4 Claims. (Cl. 35—73)

This invention relates to a learning aid device and more particularly to a stand for holding and exposing a plurality of indicia-bearing cards in any desired sequence and for quickly disposing of the cards where desired.

A learning aid device or stand according to the invention is particularly designed to help younger students, especially from the first to the fourth grade, to spell. The new stand has several rows of receptacles into which a student places cards bearing individual letters in a predetermined sequence to spell desired words or sentences. When the word or sentence is completed, or if it is to be corrected, the cards can be dropped from the receptacles by an operating lever which opens the bottoms of the receptacles. The cards then fall down and slide to the front of the stand from which they again can be selected for use in spelling other words. With the new stand, the words are easy to see and are imprinted strongly on the student's mind. The new stand also provides long periods of fascination so that the child not only learns how to spell more effectively but also spends additional time in learning to spell words. While the stand was originally intended to be used by individual students, it also can constitute an effective teaching aid for teachers who can set up the words on the stand rather than writing them on the blackboard, for example. This again provides more interest to the student being taught so that a stronger impression will be made and the correct spelling of the words will be retained longer.

The new learning device also can be used with number-bearing cards for arithmetic. Older students can use the device with different indicia on the cards to set up algebraic equations or chemical equations, by way of example.

It is, therefore, a principal object of the invention to provide an improved learning device including a stand forming a plurality of receptacles for receiving interchangeable indicia-bearing cards.

Another object of the invention is to provide an improved learning device employing indicia-bearing cards with releasable means for disposing of the cards when desired.

Other objects and advantages of the invention will be apparent from the following detailed description of a preferred embodiment thereof, reference being made to the accompanying drawing, in which:

FIG. 1 is a view in perspective of a learning device according to the invention;

FIG. 2 is a view in transverse, vertical cross section taken along the line 2—2 of FIG. 1;

FIG. 3 is a fragmentary, detailed view in perspective of a slightly modified learning device;

FIG. 4 is a view in cross section taken along the line 4—4 of FIG. 3; and

FIG. 5 is a view in cross section similar to FIG. 4 of a learning device with a modified releasing means.

Referring to the drawings and more particularly to FIGS. 1 and 2, a learning aid device or stand according to the invention is indicated at 10. The stand 10 includes two spaced sidewalls 12 and 14 with vertical panels 16 and horizontal panels 18 extending between them. Front panels 20 of clear plastic material in this instance are spaced from the vertical panel 16 and parallel thereto being fastened to outer edges of partitions 22. The vertical panels 16, the front panels 20, and the partitions 22 form a plurality of receptacles 24 arranged in a number of rows equal to the number of the vertical panels 16, with each of the rows being above and to the rear of an adjacent row. In a preferred form of the invention, twenty of the receptacles 24 are in each row, although only eight are shown.

The bottoms of the receptacles 24 in this instance are formed by parts of the horizontal panels 18 which lie under the space between the vertical panels 16 and the front panels 20. The horizontal panels 18 are pivotally attached to the sidewalls 12 and 14 by pivot means such as pivot pins 26. The horizontal panels 18 then can be pivoted in a clockwise direction, as shown in FIG. 2, to move the parts forming the bottoms of the receptacles 24 to a position below and to one side of the receptacles 24. This movement can be facilitated by levers 28 suitably affixed to the horizontal panels 18 near one end or both ends of each of them.

With the bottoms of the receptacles 24 opened, cards 30 in the receptacles will drop out and contact a sloping wall 32, sliding down the wall 32 to the front of the stand 10 where they are exposed in an opening 34. When not in use, the cards can be stored in a drawer 35. The cards 30 are of the same size and are interchangeable so that they can be inserted in any of the receptacles 24. The cards 30 also are imprinted with suitable indicia, depending upon the purpose of the learning aid. Thus, the cards 30 can carry the letters of the alphabet with the most used letters being more prevalent than others.

In operation, a child who is learning how to spell can select the appropriate cards from the opening 34 in the front of the stand and place them in the proper order in the receptacle 24 to spell a word or words. While only one of the rows of the receptacles 24 is necessary for this purpose, several rows are preferred because additional words and even sentences can be spelled. Further, with each of the rows above and to the rear of an adjacent row the words spelled by the cards 30 in the receptacles 24 will appear in the same order and manner that they would on a page of a book, providing greater significance for the words constructed by the child. When a word or a sentence is completed and another word or sentence is to be constructed, or if an error is made in the spelling of a word, the child simply raises the lever 28 to move the horizontal panel 18 under the desired row of the receptacles 24 in a clockwise manner. The part of the panel 18 previously forming the bottom of the receptacles 24 in that row will then be moved to a position below and to one side of the receptacle 24 whereby cards therein will drop from the receptacles. These cards will then hit the sloping wall 32 and slide down it to the front of the stand 10 where they will again be available at the opening 34. Once again, the child may select the appropriate cards 30 and place them in the appropriate receptacles 24. It may be noted with this arrangement that all or substantially all of the cards 30 will remain with their indicia-bearing faces exposed after dropping from the receptacles and sliding down the wall.

As previously indicated, the interchangeable cards 30 can carry indicia other than letters of the alphabet. For example, the cards 30 can carry indicia suitable for setting up algebraic equations or can carry indicia suitable for setting up chemical equations for older students. Again, as previously indicated, the stand 10, particularly if made in a somewhat larger size, can be used by a teacher to help students to spell words or to set up equations. This is particularly beneficial because it adds more interest and thereby enables the student to learn more effectively.

A fragment of a slightly modified stand is shown in FIGS. 3 and 4. In this instance, the stand differs from the stand 10 in that the receptacles are constructed slightly differently and the means for releasing the cards from the receptacles is somewhat different. A vertical panel 36 has a plurality of partitions 38 molded therewith and terminating in front panels 40. Again, the front panels 40 are spaced from and parallel to the vertical panel 36 but do not extend completely across receptacles 42 formed by the vertical panel 36, the partitions 38, and the front walls 40. The front panels 40 thereby do not need to be transparent since they extend only over the edges of the cards 30, as shown, and do not cover the indicia carried thereon.

For disposing of the cards 30, horizontal panels 44 in this instance have longitudinal slots 46 with V-shaped longitudinal edges, as shown in FIG. 4. Movable strips 48 slidably supported in the slots 46 enable the cards 30 to be released from the receptacles 42. Preferably two of the strips 48 are employed for each of the rows of the receptacles 42 with the strips extending slightly beyond the sidewalls of the stand when in their closed position so that they can be grasped by the child and pulled outwardly, thereby to open the bottoms of the receptacles 42 and enable the cards 30 to fall through the slots 46. One of the strips 48 can be used rather than two, but by employing two, they need not be pulled out as far as otherwise and it is also possible to release the cards from only half of the receptacles 42 in one of the rows.

FIG. 5 shows a slightly modified releasing means used with the same receptacle 42 shown in FIGS. 3 and 4. In this instance, however, the releasing means constitutes an individual lever indicated at 50 for each of the receptacles 42 so that the cards in the individual receptacles 42 can be separately released and dropped. The lever 50 includes an upper button 52 which can be pressed by the child and a vertical leg 54 having an arm 56 extending rearwardly therefrom and pivotally attached to a suitable pivot, in this instance a pivot rod 58 extending between the sidewalls of the stand and parallel to the rows of the receptacles. The lever 50 further includes a horizontally extending leg 60, part of which extends under the receptacle 42 and constitutes the bottom thereof. The leg 60 is held under the receptacle 42 by a suitable spring 62 connected between the vertical leg 54 and the vertical panel 36, the spring 62 being under tension to resist counterclockwise movement of the lever 50. However, the force of the spring 62 can be easily overcome by depressing the button 52 to pivot the lever 50 counterclockwise and to move the horizontal leg 60 to a position below and to one side of the receptacle 42. With this arrangement, the horizontal lever leg 60 takes the place of the strips 48 and the horizontal panels 18 so that no horizontal panels are necessary at all between the rows of the receptacles.

It is to be understood that the receptacles 24 and 42 can be formed by many suitable means and the invention is not limited to a particular construction. The vertical panels 16, the sidewalls 14 and 12, and the sloping wall 32 might be a one-piece construction of plastic, for example, or all of the parts might be formed separately and then suitably fastened together. In addition, the releasing means for the receptacles 24 and 42 is not to be limited to the constructions shown since many other suitable releasing means can be employed. For example, this can be accomplished simply by segmenting the horizontal panels 18 and either slidably supporting them or pivoting them on a common rod so that any segment can be moved to open the bottom of the receptacle under which part of the segment is located.

Various other modifications of the above described embodiments of the invention will be apparent to those skilled in the art, and it is to be understood that such modifications can be made without departing from the scope of the invention, if they are within the spirit and the tenor of the accompanying claims.

What I claim is:

1. A learning aid stand for holding a plurality of interchangeable, indicia-bearing cards of predetermined thickness, said stand comprising a pair of spaced sidewalls, a plurality of horizontal panels extending between said sidewalls, each spaced above and to the rear of an adjacent panel, a plurality of vertical panels extending from front longitudinal edges of said horizontal panels downwardly to the next horizontal panels, means cooperating with each of said vertical panels for forming a plurality of rows of receptacles for the cards, and means for dropping said cards from the bottoms of said receptacles by moving at least parts of said horizontal panels to one side of said receptacles, said dropping means including independent means associated with each of said horizontal panels so that the cards in each row of receptacles can be released without releasing cards in the other rows.

2. A stand according to claim 1 wherein said independent means constitutes means for pivotally supporting said horizontal panels wherein said horizontal panels can move between a position in which portions of the horizontal panels lie under the receptacles and constitute the bottoms thereof and a second position in which said horizontal panel portions are spaced below and to one side of the receptacles, and means attached to said horizontal panels and extending outwardly from said rows of receptacles to facilitate moving said panels between said positions.

3. A learning aid stand for holding a plurality of interchangeable, indicia-bearing cards, said stand comprising a pair of spaced sidewalls, a plurality of horizontal panels extending between said sidewalls, each spaced above and to the rear of an adjacent panel, a plurality of vertical panels extending from front longitudinal edges of said horizontal panels downwardly to the next horizontal panels, means cooperating with each of said vertical panels for forming a plurality of receptacles for the cards, means for moving at least portions of said horizontal panels to one side of the receptacles to drop said cards from the bottoms of said receptacles, with the panel portions in one row movable independently of the panel portions in another row, a sloping wall under all of said receptacles and sloping downwardly toward the front of said stand, said sloping wall extending beyond the foremost vertical panel whereby cards released from said receptacles will fall onto said sloping wall and slide down to the front of said stand.

4. A learning aid stand according to claim 1 characterized by said dropping means constituting means for sequentially dropping the cards from the receptacles in each of the rows.

References Cited by the Examiner

UNITED STATES PATENTS

| | | | |
|---|---|---|---|
| 848,711 | 4/07 | Weaver | 35—73 X |
| 985,125 | 2/11 | Bates | 221—91 X |
| 1,035,553 | 8/12 | Doering | 40—124 X |
| 1,327,775 | 1/20 | Platt | 35—73 |
| 1,349,776 | 8/20 | Mackintosh | 35—73 |
| 1,650,663 | 11/27 | Swoboda | 40—124 |
| 2,067,051 | 1/37 | Hall | 211—55 |
| 2,333,717 | 11/43 | Heed et al. | |
| 2,642,189 | 6/53 | Goodman | 211—55 |
| 2,710,473 | 6/55 | Kress et al. | 40—124 |
| 2,872,185 | 2/59 | Kropp | 40—124 X |

JEROME SCHNALL, *Primary Examiner.*